US012624864B1

(12) United States Patent
    Karkheck

(10) Patent No.: US 12,624,864 B1
(45) Date of Patent: May 12, 2026

(54) AUTOMATED WEDGE ALIGNMENT FOR SOLAR TABLE ASSEMBLY

(71) Applicant: Terabase Energy, Inc., Berkeley, CA (US)

(72) Inventor: Johann Fritz Karkheck, Petaluma, CA (US)

(73) Assignee: Terabase Energy, Inc., Berkeley, CA (US)

( * ) Notice: Subject to any disclaimer, the term of this patent is extended or adjusted under 35 U.S.C. 154(b) by 22 days.

(21) Appl. No.: 18/942,365

(22) Filed: Nov. 8, 2024

(51) Int. Cl.
| | |
|---|---|
| *F24S 25/636* | (2018.01) |
| *H02S 30/10* | (2014.01) |
| *B07C 3/06* | (2006.01) |
| *B65H 29/16* | (2006.01) |
| *B65H 29/52* | (2006.01) |

(52) U.S. Cl.
    CPC ............ *F24S 25/636* (2018.05); *H02S 30/10* (2014.12); *B07C 3/06* (2013.01); *B65H 29/16* (2013.01); *B65H 29/52* (2013.01)

(58) Field of Classification Search
    CPC .......... F24S 25/636; H02S 30/10; B07C 3/06; B65H 29/16; B65H 29/52
    See application file for complete search history.

(56) References Cited

U.S. PATENT DOCUMENTS

2021/0261339 A1    8/2021    Kira

FOREIGN PATENT DOCUMENTS

| | | | |
|---|---|---|---|
| CN | 103964018 A | 8/2014 | |
| CN | 105515508 A * | 4/2016 | ............ H02S 30/00 |
| CN | 210236181 U | 4/2020 | |
| EP | 3053859 A1 | 8/2016 | |
| WO | 2007068129 A1 | 6/2007 | |

OTHER PUBLICATIONS

CN 105515508 A English machine translation (Year: 2026).*
International Search Report and Written Opinion of the International Searching Authority mailed Jan. 29, 2026 in related PCT application No. PCT/US2025/054464, (11 pgs).

* cited by examiner

*Primary Examiner* — Angelo Trivisonno
(74) *Attorney, Agent, or Firm* — Michael North

(57)                ABSTRACT

In a typical on-site solar table assembly process, multiple solar modules are securely aligned and attached to a shaft or torque tube to form a row of solar panels. An installer uses a fastener to attach a mounting bracket to a panel frame securely. A typical installation is implemented manually by an installer. To implement automatic fastener installation, fasteners must be loaded into an automatic installation tool in the correct orientation. Embodiments of automatic wedge alignment are disclosed to improve solar table assembly efficiency. Fasteners are aligned longitudinally and separated into forward-oriented and backward-oriented fasteners output from different pairs of output rails. Applying the described embodiments may improve solar table assembly efficiency so that the overall construction process for large solar plants may be completed more efficiently.

20 Claims, 8 Drawing Sheets

Top View

Side View

AUTOMATED WEDGE ALIGNMENT FOR SOLAR TABLE ASSEMBLY

TECHNICAL FIELD

The present disclosure relates generally to solar table assembly for solar power plant installation. More particularly, the present disclosure relates to automatic wedge alignment to improve solar table assembly efficiency for large solar plant installations.

BACKGROUND

The importance of solar power systems is well understood by one skilled in the art. Government agencies and companies are scaling the size and number of solar solutions within their energy infrastructure. This transition from traditional fossil fuel energy systems to solar energy solutions presents several challenges. One challenge is the cost-effective management of the construction process and the ability to improve installation efficiency during the construction process.

A large-scale solar power plant typically includes thousands of solar modules that are located across a multi-acre terrain and that are electrically coupled to provide a source of energy. These large-scale systems are often located in remote areas and require a significant investment in materials, resources, and labor for on-site installation. It can be very challenging to maintain consistent installation processes at each point of installation within a construction site across large areas. These issues further contribute to an increase in the cost and complexity of what is already a very cost-sensitive process.

In a typical on-site solar table assembly process, multiple solar modules are securely aligned and attached to a shaft or torque tube to form a row of solar panels. Such a row of solar modules may be supported by ground piles with the torque tube securely fastened to ground piles at a desired rotational angle such that the solar modules are oriented for maximum energy production efficiency. During installation, an installer needs to attach the module frames of a solar panel to mounting brackets on the torque tube. Both the mounting brackets and the panel frames may have slots such that the mounting brackets may be aligned to a desired mounting position. An installer may use a fastener, e.g., a wedge, through the slots to attach a mounting bracket to a panel frame securely. A typically prior-art installation is implemented manually by an installer, who may need to load a fastener individually for installation. Tools used by workers to install these fasteners include hammers, mallets, slide hammers, pneumatic or electric impact hammers, clamps, powder-actuated drivers, etc.

The manual fastener installation method requires workers to align the fastener and tool before installation. The alignment and installation process can vary widely between workers for reasons such as experience, ergonomics, height, quality of vision, exhaustion, physical strength, etc. Differences between users in the alignment and installation process can lead to increased installation time, poor quality control of installed fasteners and potential damage to fasteners or module glass or backsheet. Evaluation of fastener installation quality is typically performed by the worker or supervisor through visual inspection, another process that can vary significantly between evaluators for the same reasons that cause variance in fastener installation.

Automatic fastener installation is desired to improve the efficiency of fastener installation and facilitate the installation of large-scale solar panel systems. To enable automatic fastener installation, fasteners need to be loaded into an automatic installation tool in a correct orientation. If the fasteners are misaligned, subsequent automatic fastener installation would not be implemented or have to be paused until the fasteners are correctly aligned.

What is needed are systems, devices and methods that enable automatic wedge alignment to improve solar table assembly efficiency.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the description is not intended to limit the scope of the invention to these particular embodiments. Items in the figures may be not to scale.

DETAILED DESCRIPTION OF EMBODIMENTS

Figure 1:
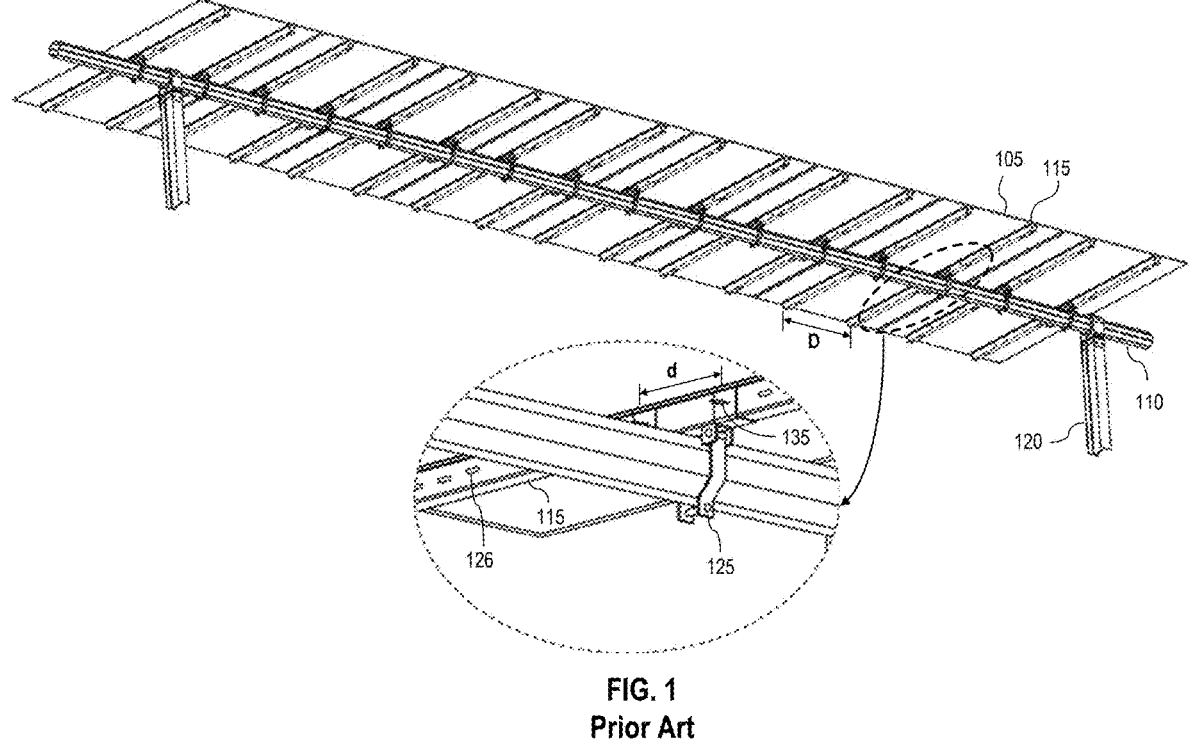
FIG. 1 shows a solar table installed on a construction site.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method.

Components, or features, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in a variety of mechanical structures supporting corresponding functionalities of the automatic fastener installer.

Furthermore, connectivity between components or systems within the figures is not intended to be limited to direct connections. Also, components may be integrated together or be discrete prior to construction of an automatic fastener alignment apparatus.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A component, function, or structure is not limited to a single component, function, or structure; usage of these terms may refer to a grouping of related components, functions, or structures, which may be integrated and/or discrete.

Further, it shall be noted that: (1) certain components or functionals may be optional; (2) components or functions may not be limited to the specific description set forth herein; (3) certain components or functions may be assembled/combined differently across different fastener installers; and (4) certain functions may be performed concurrently or in sequence.

Furthermore, it shall be noted that many embodiments described herein are given in the context of the assembly and installation of large numbers of solar panels within a system, but one skilled in the art shall recognize that the teachings of the present disclosure may apply to other large and complex construction sites in which resources and personnel are difficult to manage and accurately predict. Additionally, embodiments of an automatic fastener installer may be implemented in smaller construction sites or construction sites for applications other than solar farms.

In this document, "large-scale solar system" or "large solar projects" is defined as a solar system or project involving installation and/or operation of 1000 or more solar modules. The word "resources" is defined as material, parts, components, equipment or any other items used to construct a solar table and/or solar system. The term "solar table" is defined as a structural assembly comprising one or more photovoltaic (PV) or solar modules and/or one or more module frames (or purlins) for module support. Some types of solar tables may have electrical harnesses and supplemental structures that allow them to connect to other solar tables or foundations/piles while other types do not have this supplemental structure. The term "torque tube" is defined as a structural component that supports multiple solar modules with proper alignment. Torque tubes are often part of tracking systems for optimal sunlight capture for solar modules, and typically have a polygonal or circular cross-sectional shape. The term "fastener" is defined as a hard device that mechanically joins or affixes a module frame and a mounting bracket together such that a solar module is securely locked onto a torque tube. The term "transport vehicle" is defined as a specifically designed vehicle to transport solar tables from the centralized solar table assembly factory for on-site installation or on-site storage. The transport vehicle may be driven by personnel, controlled by remote control, or autonomously driven by a computer system.

FIG. 1 shows a solar table installed on a construction site. Multiple solar modules 105 are securely aligned to form a row of solar panels and attached to a shaft or torque tube 110, which are supported by ground piles 120. Each solar module may typically have two module frames 115 with a frame distance D in between. The torque tube is securely fastened to the ground piles and may be fixed at a desired rotational angle or be rotatable during operation such that the solar panels can operate continually under maximum energy production efficiency. To securely attach a solar module to a torque tube, the module frames 115 of the solar module are firmly connected to a mounting bracket 125, which is firmly clamped or coupled to the torque tube 110. The module frame 115 has multiple slots 116, and the mounting bracket 125 typically has a pair of slots 126 that are positioned on both sides of the torque tube with a slot distance d in between. The mounting bracket 125 may be aligned to a desired mounting position and be securely attached to a panel frame 115 using a fastener 135 through the slots of the mounting bracket 125 and the panel frame 115.

Figure 2:
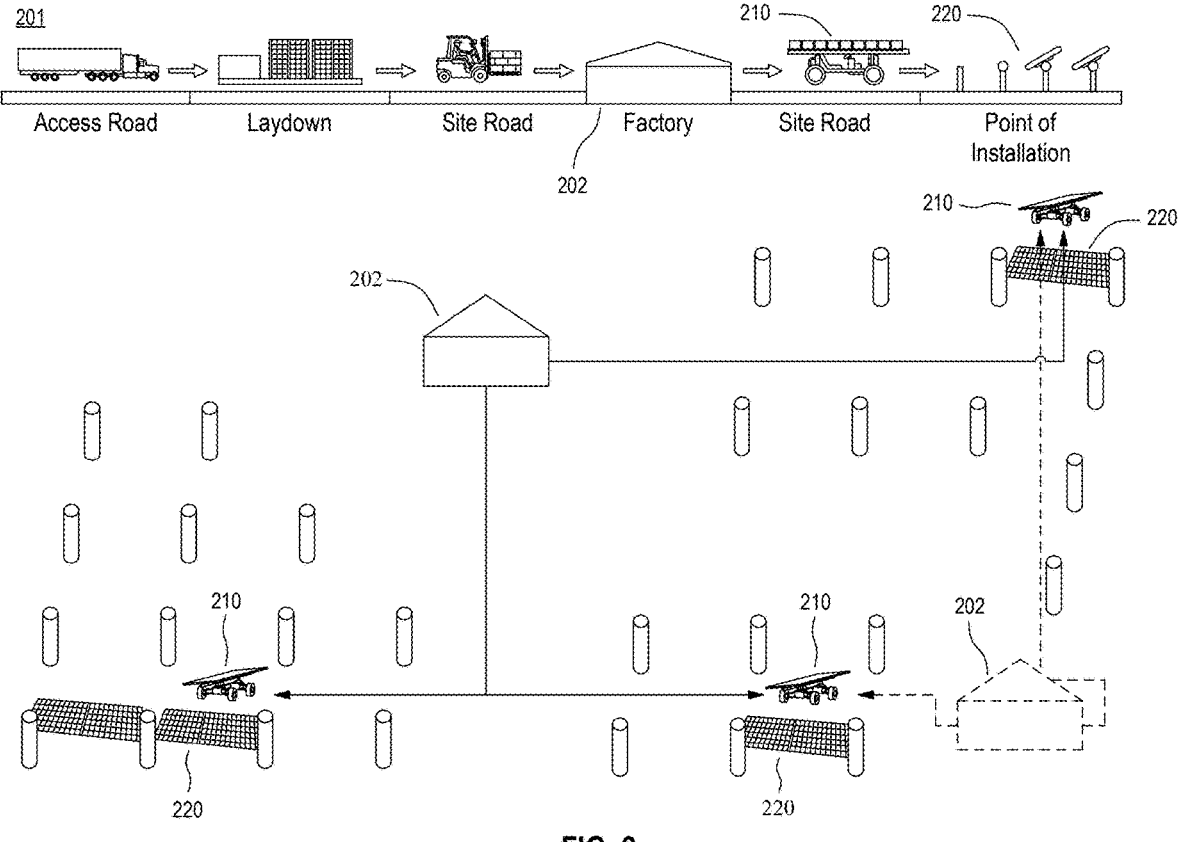
FIG. 2 depicts a centralized solar table assembly and installation for large-scale solar systems according to various embodiments of the invention.

FIG. 2 provides an overview of a centralized solar table assembly and installation for large-scale solar systems according to various embodiments of the invention. Embodiments of the invention transition the traditional approach of distributed assembly and installation at single location sites to a centralized and coordinated assembly factory that allows a more cost-effective and dynamic process of constructing large-scale solar systems. This centralized assembly of solar system components, such as solar tables, necessitates a more robust transport vehicle to move the preassembled components to the installation site.

Resources are brought to construction site 201 for a large-scale solar system and initially processed. These resources are delivered to one or more assembly factories 202 where a coordinated and centralized solar table assembly process is performed. In certain embodiments, a construction site may have multiple centralized factories 202. The location and number of centralized factories 202 may depend on several parameters, including the size of the site, the terrain of the site, the design of the site, and other variables that relate to the construction of the large-scale solar system. Solar table assembling may be performed at a centralized factory 202. The assembled solar table may be transported to a point of installation 220 via motorized vehicles 210.

Figure 3:
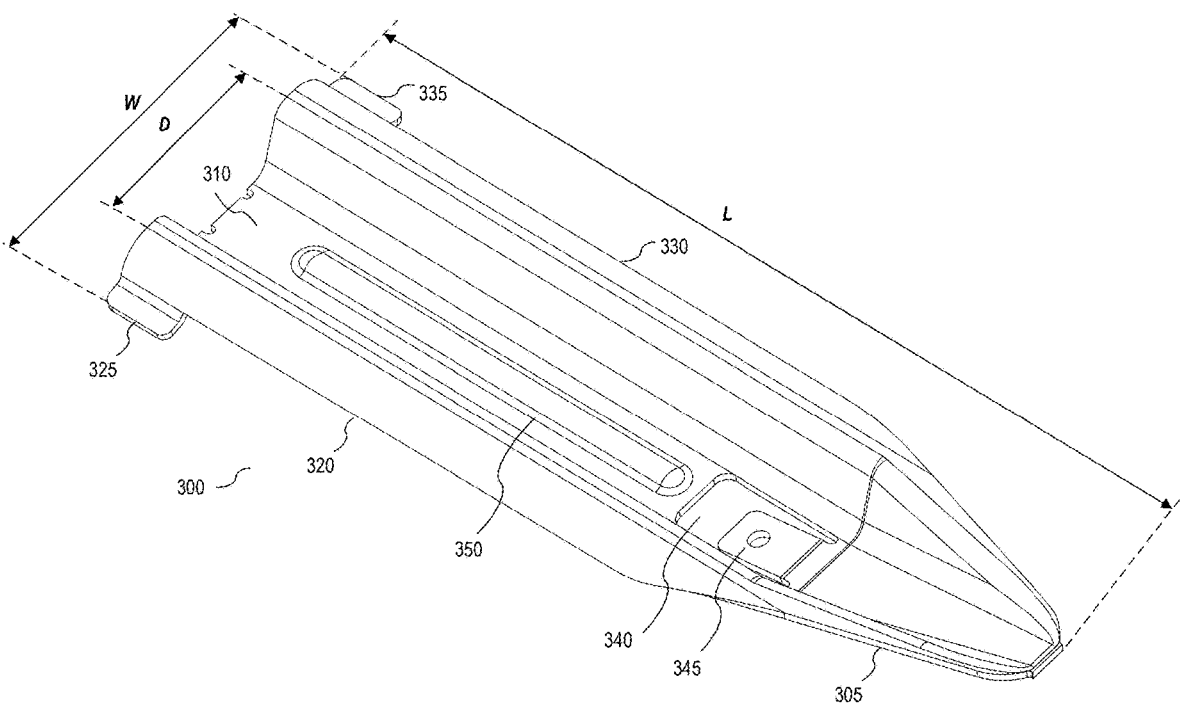
FIG. 3 depicts a perspective view of a fastener in accordance with various embodiments of the invention.

Automatic solar table assembling may be implemented in the centralized factor. It may comprise multiple steps, including automatic fastener installation to secure, via a fastener, a solar module onto a module interface bracket (MIB) that is installed on a torque tube. FIG. 3 depicts a perspective view of a fastener in accordance with various embodiments of the invention. The fastener 300, e.g., a wedge, comprises a tapered fastener head 605, which narrows towards a leading fastener end 306, and a fastener body 310, which has an open-curve cross-sectional shape, e.g., a U-shape. The fastener body 310 has a first longitudinal wing 320 and a second longitudinal wing 330 that extend outward and have a wing distance D in between the longitudinal wings. The first longitudinal wing 320 and the second longitudinal wing 330 have a first tail protrusion 325 and a second tail protrusion 335, which protrude cross-sectionally beyond the longitudinal wings. The distance between the tail protrusions 325 and 335 defines a width W of the fastener.

In one or more embodiments, the fastener body 310 may have an opening 340 in the proximity of the tapered fastener head 305 and a tab 345, protruding from the opening, slightly beyond the fastener body 310 in a normal state and extending in a direction away from the tapered fastener head 305. The tab 345 may be compressed inwardly in a compressed state when the fastener is pushed through a slot. Once the tab 345 passes the slot, the tab emerges from the compressed state and prevents the fastener from backing out of the slot. The tab and the first and second tail protrusions may jointly lock the fastener in an engaged position and prevent the fastener from moving away forwardly or backwardly from the engaged position.

For long-term durability, the fastener 300 may be made of hard metal or alloy, such as steel or zinc-coated steel. The fastener body 310 may have a cross-section slightly larger than a slot. When the fastener 300 is pushed across the slot, the first longitudinal wing 320 and the second longitudinal wing 330 may be compressed inwardly by the slot. Such compression may prevent the fastener 300 from sliding along the slot and thus hold the fastener 300 still once the fastener 300 is engaged. The fastener 300 may further comprise a reinforcing rib 350 longitudinally placed on the fastener body 310 to increase the stiffness of the fastener 300.

In one or more embodiments, the tab 345 may extend in a direction perpendicular to the longitudinal wings 320 and 330, as shown in FIG. 3. Such an offset arrangement ensures that the locking mechanisms of wing compression and tab extrusion may function in synergy for optimized fastener locking. One skilled in the art shall recognize that the fastener may be modified and/or supplemented with various structural and function elements to further assist in fastener locking.

Fasteners need to be loaded into an automatic installation tool in the correct orientation to enable automatic fastener installation. If the fasteners are misaligned, subsequent automatic fastener installation needs to be paused until the fasteners are correctly aligned. Described hereinafter are systems, devices, and methods that enable automatic wedge alignment to improve solar table assembly efficiency.

A. Embodiments of Automatic Wedge Alignment

Figure 4:
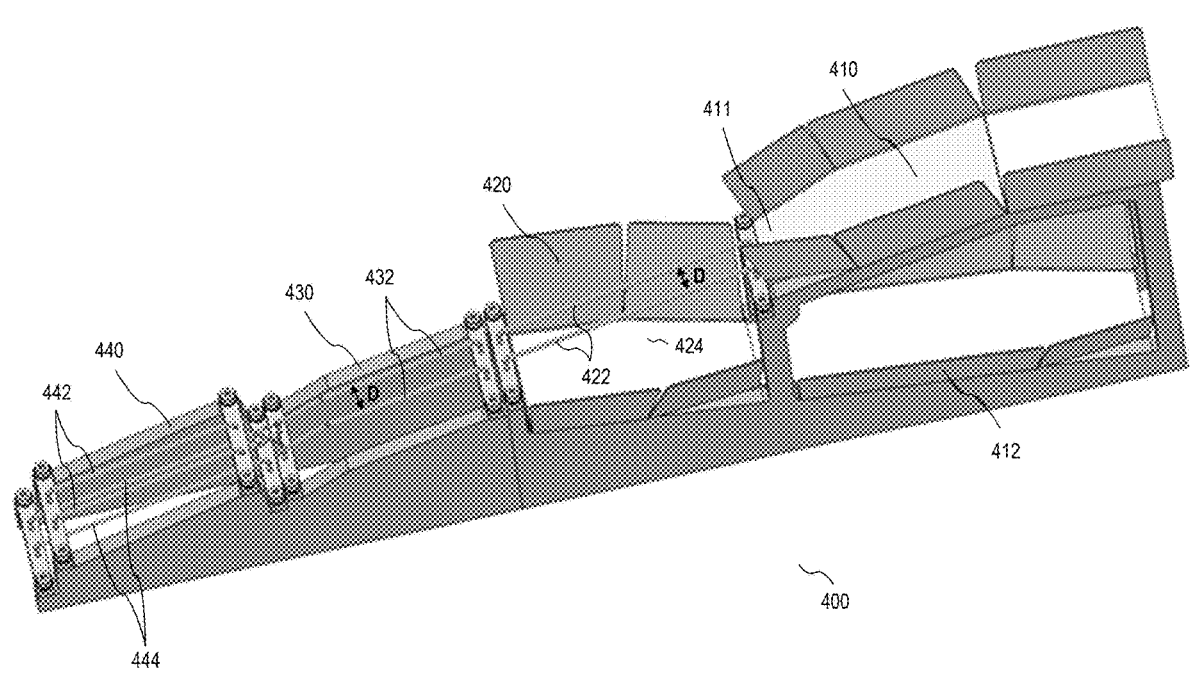
FIG. 4 depicts a perspective view of a fastener alignment apparatus in accordance with various embodiments of the invention.
Figure 5:
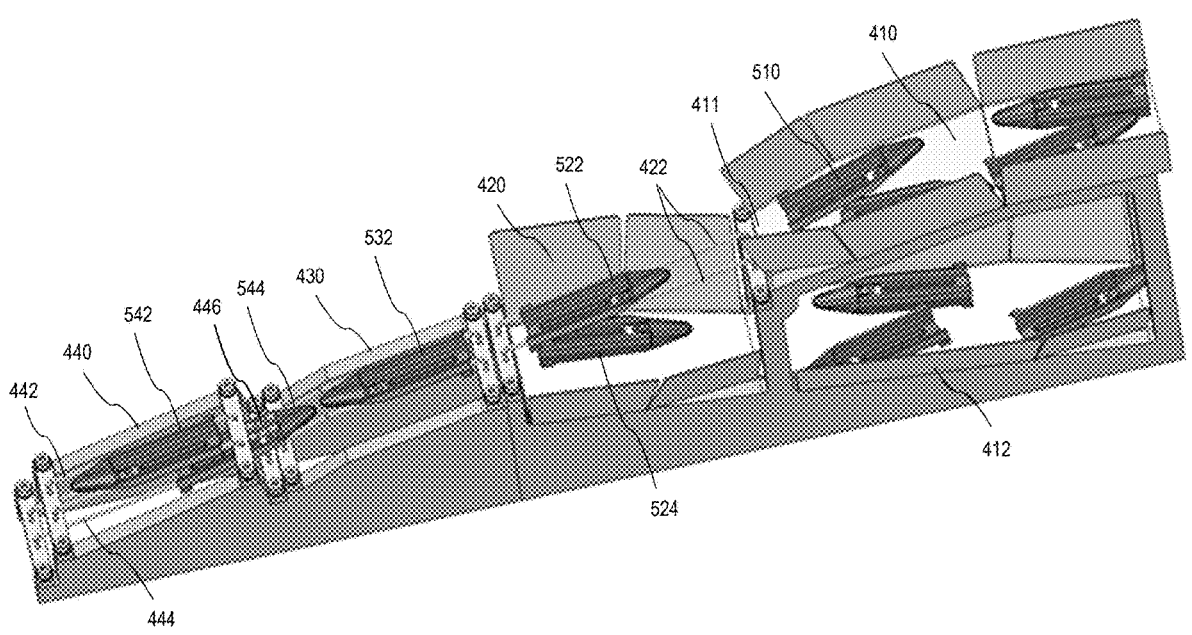
FIG. 5 depicts a perspective view of fasteners aligned in the fastener alignment apparatus in accordance with various embodiments of the invention.

FIG. 4 depicts a perspective view of a fastener alignment apparatus in accordance with various embodiments of the invention. FIG. 5 depicts a perspective view of fasteners aligned in the fastener alignment apparatus in accordance with various embodiments of the invention.

The fastener alignment apparatus 400 comprises a fastener receiving section 410, a first sliding section 420, a second sliding section 430, and an output section 440. The fastener alignment apparatus 400 may be coupled or placed on a vibrator, e.g., an electromagnetic vibrator, to drive fastener movement on the fastener alignment apparatus 400. The slope of the fastener alignment apparatus 400 may be increased to allow gravity to drive fastener movement.

The fastener receiving section 410 receives fasteners 610 and allows the fasteners to longitudinally exit through an opening 411 that has a width larger than the width W but less than the length L of a fastener. The fastener receiving section 410 has a receiving surface slanting toward the opening to facilitate fastener movement toward the opening 411. It shall be noted that fasteners may exit from the opening in a forward (head exiting first) or backward (tail exiting first) position.

The first sliding section 420 is placed next to the fastener receiving section 410. The first sliding section 420 comprises a first pair of sliding rails 422 that reach the opening 411 and extend downwardly with a slope, which may or may not be the same as the surface of the fastener receiving section 410. The first pair of sliding rails 422 are parallel to each other and have a rail distance that is the same as the wing distance D between the longitudinal wings so that the fastener 622 is supported by the sliding rails 422 when exiting from the opening to slide down.

The first sliding section 420 may further comprise side walls and a receiving surface 424 to catch fasteners 524 that are either missing the sliding rails 422 or oriented upside-down. Ideally, the fasteners oriented right side up should all catch the rails. The exit width of the opening 411 controls the success rate of right side up fasteners catching the rails 422. The receiving surface 424 inclines backwardly such that the fasteners 524 may be re-collected at a collection area 412, which may be placed beneath the fastener receiving section 410 for a space-saving layout that allows re-collected fasteners to be fed back into the system providing fasteners to the fastener receiving section 410.

The second sliding section 430 is placed next to the first sliding section 420. The second sliding section 430 comprises a second pair of sliding rails 432 that extend downwardly from the first pair of sliding rails 422 and, optionally, has an initial slope the same as the first pair of sliding rails 422 for a smooth fastener sliding transition from the first sliding section 420 toward the second sliding section 420.

Figure 6:
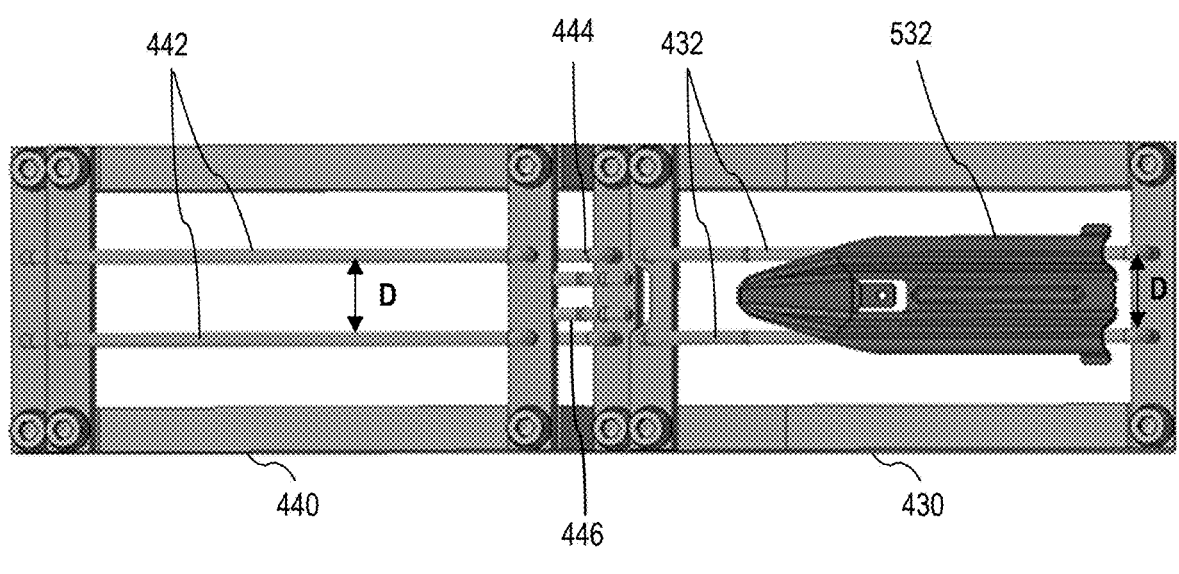
FIG. 6 depicts a top view and a side view of two sections of a fastener alignment apparatus in accordance with various embodiments of the invention.

FIG. 6 depicts a top view and a side view of the second sliding section and the output section of a fastener alignment apparatus in accordance with various embodiments of the invention. As shown in the figure, each of the second pair of sliding rails 432 has a first rail segment 436 that has the same slope as the first pair of sliding rails 422 and a second rail segment 438 that is inclined downward furthermore. In other words, the second rail segment 438 has a downward slope more than the first rail segment 436.

The output section 440 comprises a first pair of output rails 442 and a second pair of output rails 444 positioned beneath the first pair of output rails 442. Furthermore, the output section 440 comprises one or more rail protrusions 446 that are placed on an entry edge of the output section 440 and above the second rail segment 438. The one or more rail protrusions 446 extend toward the first rail segment 436 with a gap G less than the length L of a fastener such that a forward-oriented fastener can be supported by the protrusions 446 during the sliding transition from the second sliding section 430 toward the output sliding section 440. The gap G may be dependent on the fastener geometry, e.g., a location of the central of gravity (CG) of the fastener. For example, when the CG of the fastener is at 0.42 L away from the tail, the gap G should be less than 0.58 L. When the protrusions 446 touches a leading edge of the backward-facing fastener, the protrusions 446 forces the fastener down on to the rails 444; when the protrusions 446 touches a leading edge of a forward-oriented fastener, it forces the fastener up on to the rails 442.

Furthermore, the gap G is set to ensure that when the tapered fastener head of a forward-oriented fastener (e.g., 532) reaches the rail protrusions 446, the forward-oriented fastener is not tilted toward the second rail segment 438 (staying on the first rail segment 436) and thus guided to slide along the first pair of output rails 442; the gap G is also set to ensure that when a back end of a backward-oriented fastener (e.g., 544) approaches the rail protrusions 446, the backward-oriented fastener 544 is tilted toward the second rail segment 438 and thus escapes down to the second pair of output rails 444.

In one or more embodiments, the one or more rail protrusions 446 comprise a pair of rail protrusions for a balanced support for sliding transition. The pair of rail protrusions may be positioned horizontally within the second pair of output rails 444 so that rail protrusions can catch and support the tapered fastener head of the fastener 532.

Preferably, the one or more rail protrusions 446 have a slope the same as the first rail segment 436 for a smooth fastener sliding transition from the second sliding section 430 toward the output sliding section 440.

Ultimately, fasteners exiting from the opening in a forward orientation slide through the first sliding section 420 and the second sliding section 430. These forward-oriented fasteners are the output from the first pair of output rails 442 of the output section 440. Fasteners exiting from the opening in a backward orientation slide through the first sliding section 420 and the second sliding section 430. These backward-oriented fasteners are then output from the second pair of output rails 444 of the output section 440. Accordingly, fasteners received from a feeder are aligned longitudinally in a forward orientation and a backward orientation at the fastener alignment apparatus. Furthermore, the fasteners are also oriented latitudinally, with only upward-oriented fasteners (defined as fasteners with "U" shape of the fastener body 310 facing upward) reaching the output section 440.

Although two separate sliding section s are shown in the fastener alignment apparatus depicted in FIGS. 4-6, one skilled in the art shall understand that the two sliding section s may be combined as a single sliding section with the first pair of sliding rails 422 and the second pair of sliding rails 432 joined as a single pair. Such variations are within the scope of the present disclosure.

B. Embodiments of Bracket and Module Installation onto a Torque Tube

Figure 7:
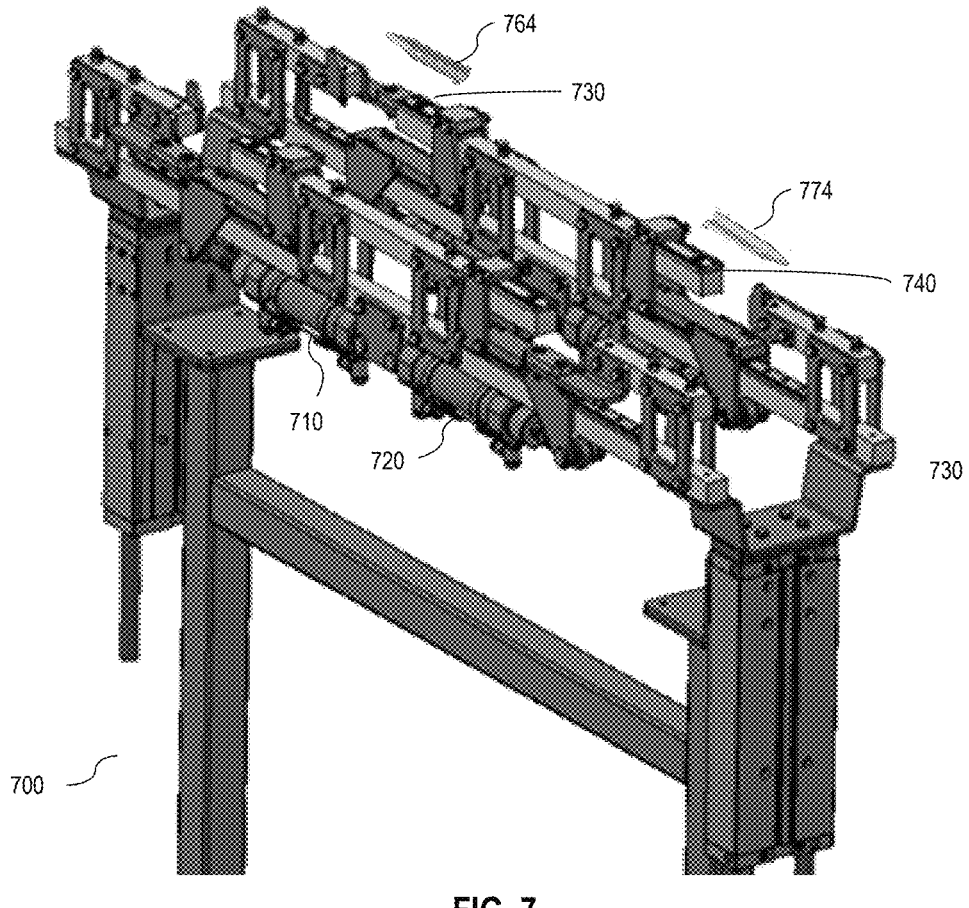
FIG. 7 depicts a perspective view of a fastener loader loading fasteners onto an automatic fastener driver in accordance with various embodiments of the invention.

FIG. 7 depicts a perspective view of an automatic fastener driver in accordance with various embodiments of the invention. The automatic fastener installer 700 uses actuators, e.g., 710/720, to drive fastener holders 730/740 respectively such that when the actuators are activated, the fastener holders are driven to push corresponding fasteners 764/774 for installation. The first actuator 710 and the second actuator 720 are oriented in opposite directions so that the activation momentum of these two actuators may be offset for a smooth operation with minimized vibration for fastener installation. To accommodate the actuator configuration, the fasteners 764 and 774 are in opposite longitudinal directions. For example, the fastener 764 is in a forward longitudinal orientation, which may be output from the first pair of output rails 442, while the fastener 774 in a backward longitudinal orientation, which may be output from the second pair of output rails 444. It shall be noted that both fasteners 764/774 are upward-oriented with their U-shape fastener bodies facing upward.

Figure 8:
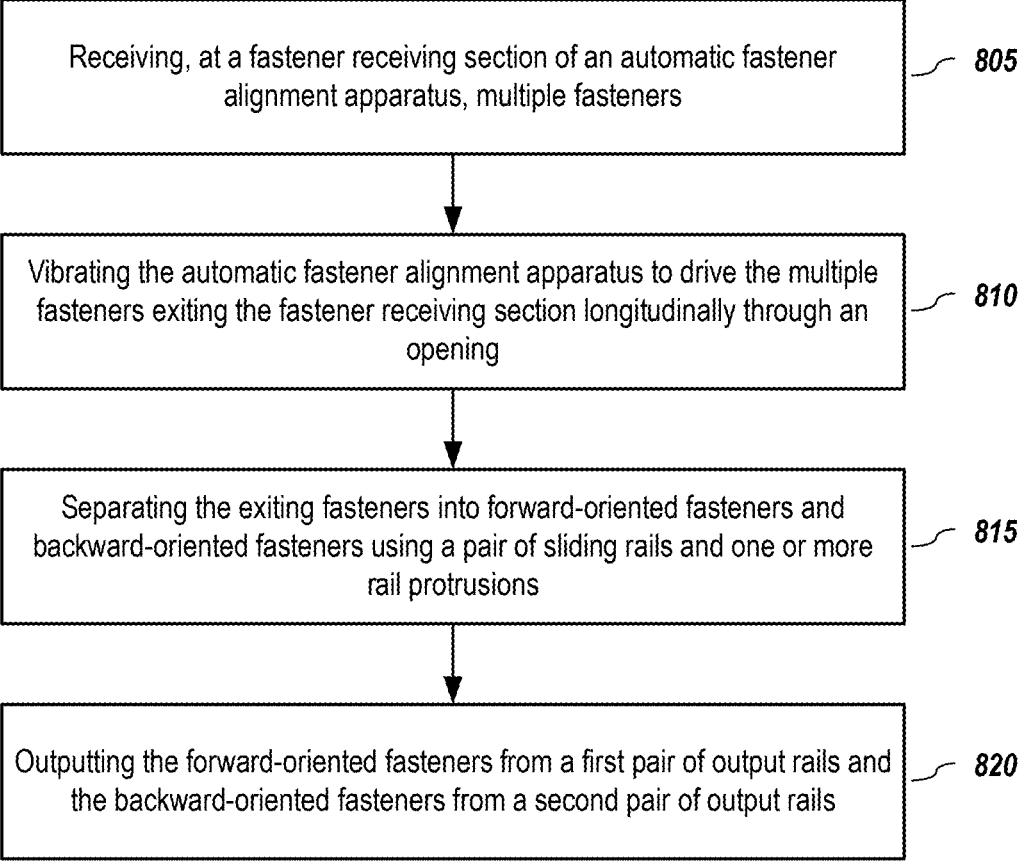
FIG. 8 depicts a process for automatic fastener alignment in accordance with various embodiments of the invention.

FIG. 8 depicts a process for automatic fastener alignment in accordance with various embodiments of the invention. In step 805, multiple fasteners are received at a fastener receiving section of an automatic fastener alignment apparatus. In step 810, the automatic fastener alignment apparatus is vibrated to drive the multiple fasteners exiting the fastener receiving section longitudinally through an opening that is wider than a fastener width but less than a fastener length. Furthermore, downward-oriented fasteners and upward-oriented fasteners are separated besides orienting the right side up fasteners in the longitudinal direction. In other words, downward-oriented fasteners are dropped or removed at the second sliding section 420 since those downward-oriented fasteners cannot be stably supported by the pair of sliding rails 422.

In step 815, the exiting fasteners are separated into forward-oriented fasteners and backward-oriented fasteners using a pair of sliding rails and one or more rail protrusions. In step 820, the forward-oriented fasteners are output from a first pair of output rails, and the backward-oriented fasteners are output from a second pair of output rails. The forward-oriented fasteners and the backward-oriented fasteners may then be transported via a conveyor toward a fastener loader for fastener fetching and loading.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently, including having multiple dependencies, configurations, and combinations.

What is claimed is:

1. A method of automatic fastener alignment for solar table assembly, the method comprising:
    receiving, at a fastener receiving section of an automatic fastener alignment apparatus, multiple fasteners, each fastener has a fastener width and a fastener length;
    driving the multiple fasteners exiting the fastener receiving section longitudinally through an opening that is wider than the fastener width but less than the fastener length;
    separating, in a sliding section, the exiting fasteners into forward-oriented fasteners and backward-oriented fasteners, the sliding section comprises one or more rail protrusions and a pair of sliding rails that also removes downward-oriented fasteners and keeps upward-oriented fasteners;
    outputting the forward-oriented fasteners from a first pair of output rails at an output section of the automatic fastener alignment apparatus and the backward-oriented fasteners from a second pair of output rails at the output section of the automatic fastener alignment apparatus.

2. The method of claim 1, wherein the automatic fastener alignment apparatus is vibrated to drive the multiple fasteners to exit the fastener receiving section.

3. The method of claim 1, wherein each fastener comprises a tapered fastener head and a fastener body that has a first longitudinal wing and a second longitudinal wing extending outward and have a wing distance in between the longitudinal wings.

4. The method of claim 3, wherein the pair of sliding rails are parallel to each other and have a rail distance that same as the wing distance.

5. The method of claim 4, wherein each sliding rail comprises a first rail segment and a second rail segment that has a downward slope more than the first rail segment.

6. The method of claim 5, wherein the one or more rail protrusions are placed on an entry edge of the output section and above the second rail segment of the pair of sliding rails, the one or more rail protrusions extend toward the first rail segment with a gap to allow the backward-oriented fasteners to escape down to the second pair of output rails.

7. The method of claim 5, wherein the one or more rail protrusions comprise a pair of rail protrusions for a balanced support, the pair of rail protrusions has a slope the same as the first rail segment.

8. The method of claim 6, wherein the gap is set to ensure that when the tapered fastener head of a forward-oriented fastener reaches the one or more rail protrusions, the one or more rail protrusions catches an underside of the tapered fastener head and forces the forward-oriented fastener up onto the first pair of output rails.

9. The method of claim 6, wherein the gap is set to ensure that when a back end of a backward-oriented fastener approaches the one or more rail protrusions, the one or more rail protrusions catches the back end and forces the backward-oriented fastener toward onto the second pair of output rails.

10. The method of claim 1, wherein the second pair of output rails are positioned beneath the first pair of output rails.

11. An automatic fastener alignment apparatus comprising:

a fastener receiving section that receives multiple fasteners, each fastener has a fastener width and a fastener length, the fastener receiving section has an opening wider than the fastener width but less than the fastener length such that the multiple fasteners exit the fastener receiving section longitudinally through the opening;

a sliding section that comprises a pair of sliding rails that removes downward-oriented fasteners and keeps upward-oriented fasteners from the exiting fasteners, the sliding section further comprises one or more rail protrusions to separate the upward-oriented fasteners into forward-oriented fasteners and backward-oriented fasteners; and an output section that comprises a first pair of output rails to output the forward-oriented fasteners and a second pair of output rails to output the backward-oriented fasteners.

12. The automatic fastener alignment apparatus of claim 11, wherein the multiple fasteners are driven to exit the fastener receiving section by vibration of the automatic fastener alignment apparatus.

13. The automatic fastener alignment apparatus of claim 11, wherein each fastener comprises a tapered fastener head and a fastener body that has a first longitudinal wing and a second longitudinal wing extending outward and have a wing distance in between the longitudinal wings.

14. The automatic fastener alignment apparatus of claim 13, wherein the pair of sliding rails are parallel to each other and have a rail distance that same as the wing distance.

15. The automatic fastener alignment apparatus of claim 13, wherein each sliding rail comprises a first rail segment and a second rail segment that has a downward slope more than the first rail segment.

16. The automatic fastener alignment apparatus of claim 15, wherein the one or more rail protrusions are placed on an entry edge of the output section and above the second rail segment of the pair of sliding rails, the one or more rail protrusions extend toward the first rail segment with a gap.

17. The automatic fastener alignment apparatus of claim 15, wherein the one or more rail protrusions comprise a pair of rail protrusions for a balanced support for sliding transition, the pair of rail protrusions has a slope the same as the first rail segment.

18. The automatic fastener alignment apparatus of claim 16, wherein the gap is set to ensure that when the tapered fastener head of a forward-oriented fastener reaches the one or more rail protrusions, the one or more rail protrusions catches an underside of the tapered fastener head and forces the forward-oriented fastener up onto the first pair of output rails.

19. The automatic fastener alignment apparatus of claim 16, wherein the gap further ensures that when a back end of a backward-oriented fastener approaches the one or more rail protrusions, the one or more rail protrusions catches the back end and forces the backward-oriented fastener toward onto the second pair of output rails.

20. The automatic fastener alignment apparatus of claim 11, wherein the second pair of output rails arc positioned beneath the first pair of output rails.

* * * * *